United States Patent [19]

Lindenfelser

[11] Patent Number: 4,750,012

[45] Date of Patent: Jun. 7, 1988

[54] LINEAR REFLEX SHUTTER FOR SLR CAMERAS

[75] Inventor: Jerome W. Lindenfelser, Brooklyn Park, Minn.

[73] Assignee: Photo Control Corporation, Minneapolis, Minn.

[21] Appl. No.: 119,157

[22] Filed: Nov. 10, 1987

[51] Int. Cl.$^4$ .................. G03B 19/12; G03B 15/03
[52] U.S. Cl. ........................... 354/152; 354/136
[58] Field of Search ............ 354/152, 154, 155, 156, 354/136

[56] References Cited

U.S. PATENT DOCUMENTS

| | | | |
|---|---|---|---|
| 3,008,397 | 11/1961 | Winkler | 354/156 |
| 3,785,270 | 1/1974 | Schiff et al. | 354/156 |
| 3,911,454 | 10/1975 | Ohmoria | 354/154 |
| 4,319,819 | 3/1982 | Lindenfelser | 354/154 |
| 4,659,202 | 4/1987 | Sadre-Marandi et al. | 354/152 |

Primary Examiner—A. A. Mathews
Attorney, Agent, or Firm—Vidas & Arrett

[57] ABSTRACT

A reflex camera having a mirror holding mechanism mounted to a slideable track which moves the mirror linearly in and out of the optical path through the lens. The mechanism is positively driven to a picture taking position by a rotary solenoid. A shutter member cooperates with the slide mechanism. The shutter is cocked and released by the slide mechanism. Return of the slide mechanism to a viewing position pulls the shutter back out of the optical path.

6 Claims, 5 Drawing Sheets

LINEAR REFLEX SHUTTER FOR SLR CAMERAS

FIELD OF THE INVENTION

This invention relates to cameras and more particularly to the movement of the reflecting mirror out of the light path from the lens to the film for exposure and to a shutter for reclosing that light path.

BACKGROUND OF THE INVENTION

In a single lens reflex camera, the image of the subject to be photographed is viewed through the lens on a focusing screen with the aid of a mirror disposed between the lens and the shutter. The mirror is angularly disposed such that it reflects the image received through the lens onto the screen before the picture is taken. When the shutter is activated, the mirror moves out of the path of the light to permit the light to pass onto the film.

In most reflex cameras, the mirrors are pivotably mounted to the camera body such that they swing out of the path between the lens and the shutter when the shutter is activated. The rotary motion requires a camera body with greater depth. Also, the number of times of mirror must pivot may create frequent servicing or failures.

One prior art solution is shown in U.S. Pat. No. 4,659,202 which issued to Sadre-Marandi et al on April 21, 1987. In that patent, the mirror and image focusing screen move together in a linear path to eliminate the problems associated with pivots. Also, the spacing between the lens and film may be smaller. In U.S. Pat. No. 4,659,202 a motor is used to cock the slide mechanism into the normal viewing position. Upon tripping, a pair of coil springs pull the mirror and image focusing screen out of the light path and the shutter then opens to allow exposure of the film. Springs are thus very crucial in that both springs must function perfectly in order to smoothly carry the support mechanism as desired.

SUMMARY OF THE INVENTION

The present invention provides a reflex camera having a housing which bears an objective lens and a film plane within the housing disposed in the optical path through the lens. The camera includes shutter means for momentarily exposing the film plane to the light image from the lens. This shutter means comprises a flat stationary shutter plate having an aperture therethrough aligned with the optical path to permit exposure of the film. It also includes a mirror support bearing a mirror and slidable through viewing and shutter opening positions. The mirror support in its viewing position positions the mirror between the aperture and the film plane to mask the film plane from the lens. The shutter includes a flat masking plate mounted to the housing and slidable between the aperture plate and mirror support between a latched position out of alignment of the optical path and a shutter close position masking the aperture from the film.

The mirror support or slide mechanism requires less space to operate in due to its linear motion. It allows construction of a heavier duty longer life mechanism which will fit within the fixed distance between the lens flange and film plane of existing zoom lens. The reflex mirror support is also a part of the shutter mechanism to reduce the number of parts. It also reduces the delay time from camera trip to exposure reducing the possibility of blinks.

A slide mechanism is driven linearly by a rotary solenoid and linkage means which positively drives the slide mechanism into a picture taking position. The spring action of the solenoid is utilized to return the support to a viewing finding position. Positive motor driven movement of the slide mechanism means that during the entire travel the slide mechanism is under complete control. Parameters of travel including speed, acceleration and time can be closely controlled from one camera to the next. After long usage, each action of the slide mechanism in moving to a picture taking position should be as reliable as the first. Failure or fatigue of springs will not cause the picture taking quality to differ.

Shortly before the slide mechanism has reached its fullest driven position, the masking plate is released and the flash is tripped just when the mirror support travels to a position clear of the aperture. This insures that the exposure will be completed by the time the mirror support comes to a stop which will avoid camera movement and noise during exposure. The masking plate is released by movement of the slide mechanism and the masking plate is pulled to its light blocking position. The masking plate is drawn back to a cocked position by engagement with the slide mechanism as the slide mechanism returns to a normal viewing position by a spring on the rotary solenoid.

BRIEF DESCRIPTION OF THE DRAWINGS

A detailed description of the invention is hereafter described with specific reference being made to the drawings in which.

DETAILED DESCRIPTION OF THE INVENTION

Referring to the figures, the inventive reflex camera with its improved shutter and mirror arrangement is shown. In particular, FIGS. 1 through 3 diagrammatically shows the relationship of the slide mechanism and masking plate to the lens, aperture and film plane of the camera.

Figure 1:
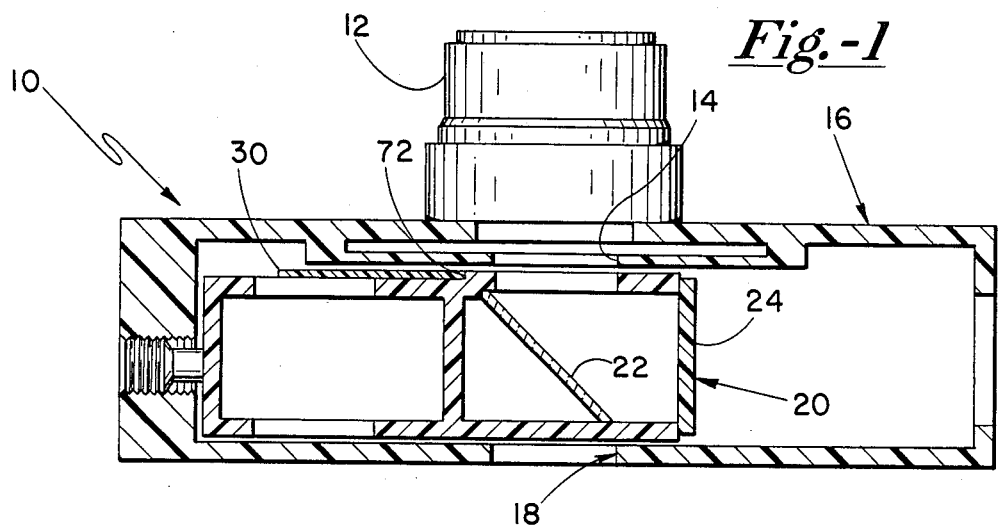
FIG. 1 is a diagrammatic view depicting the general arrangement of a single lens reflex camera incorporating the mirror focusing screen mounting drive system and masking plate constructed in accordance with the invention.

In FIG. 1, the camera 10 is shown having a lens 12, aperture 14, housing body 16 and film plane 18. A slide mechanism 20 is shown in cross-section within the confines of housing 16. In FIG. 1, slide mechanism 20 is oriented in a viewing position. A mirror 22 is supported by slide mechanism 20 and is arranged such that the image from lens 12 is reflected to an image forming focusing screen 24. The image on screen 24 is seen by the photographer through a viewer 26, best shown in FIG. 4.

Figure 2:
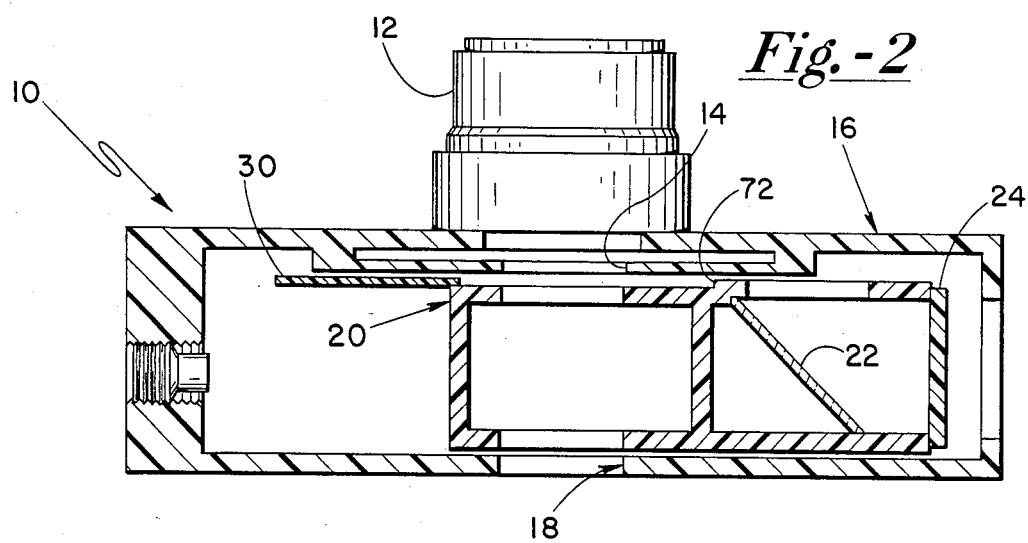
FIG. 2 is a diagrammatic view of the camera of FIG. 1 in the exposure mode with the shutter open.
Figure 3:
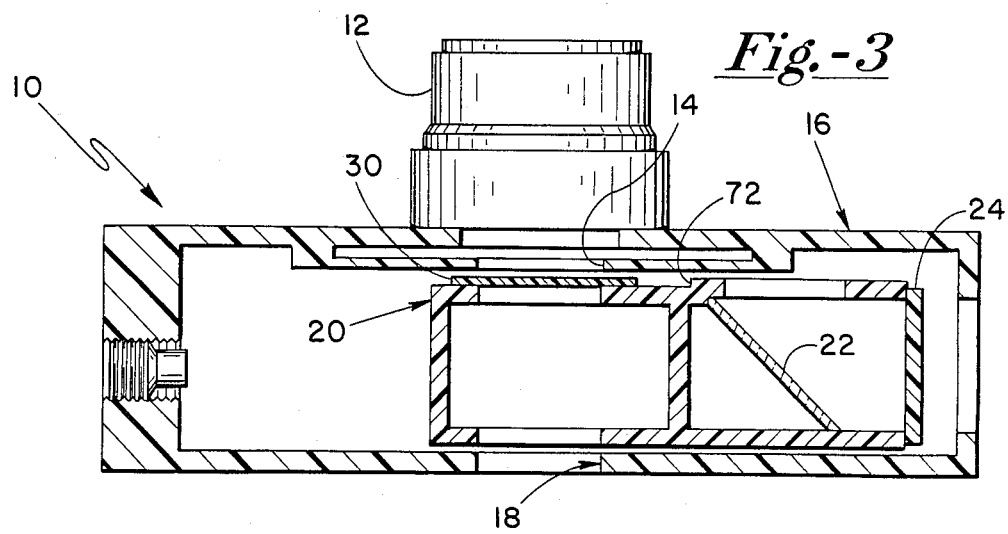
FIG. 3 is a diagrammatic view of the camera of FIG. 1 showing the shutter closed and masking plate released before the slide mechanism has returned to a viewing mode.

In FIG. 2, the slide mechanism 20 has moved linearly to a picture taking position with the shutter open such that light through the lens may expose film at film plane 18. In FIG. 3, a masking plate 30 has been released and cuts off the exposure. As seen in FIG. 1, masking plate 30 cooperatively engages with slide mechanism 20 such that movement of slide mechanism 20 back to a viewing position returns the masking plate 30 to a latched, ready position out of the optical path.

As shown in FIGS. 4 through 7, slide mechanism 20 is slidably mounted to housing 16 by a linear slide track 32. A mating portion 34 is attached to slide mechanism 20 such that the mechanism may move linearly in the path shown by the composite of FIGS. 1-3. Track 32 allows the slide mechanism to freely glide back and forth in a smooth, unimpeded manner.

Figure 4:
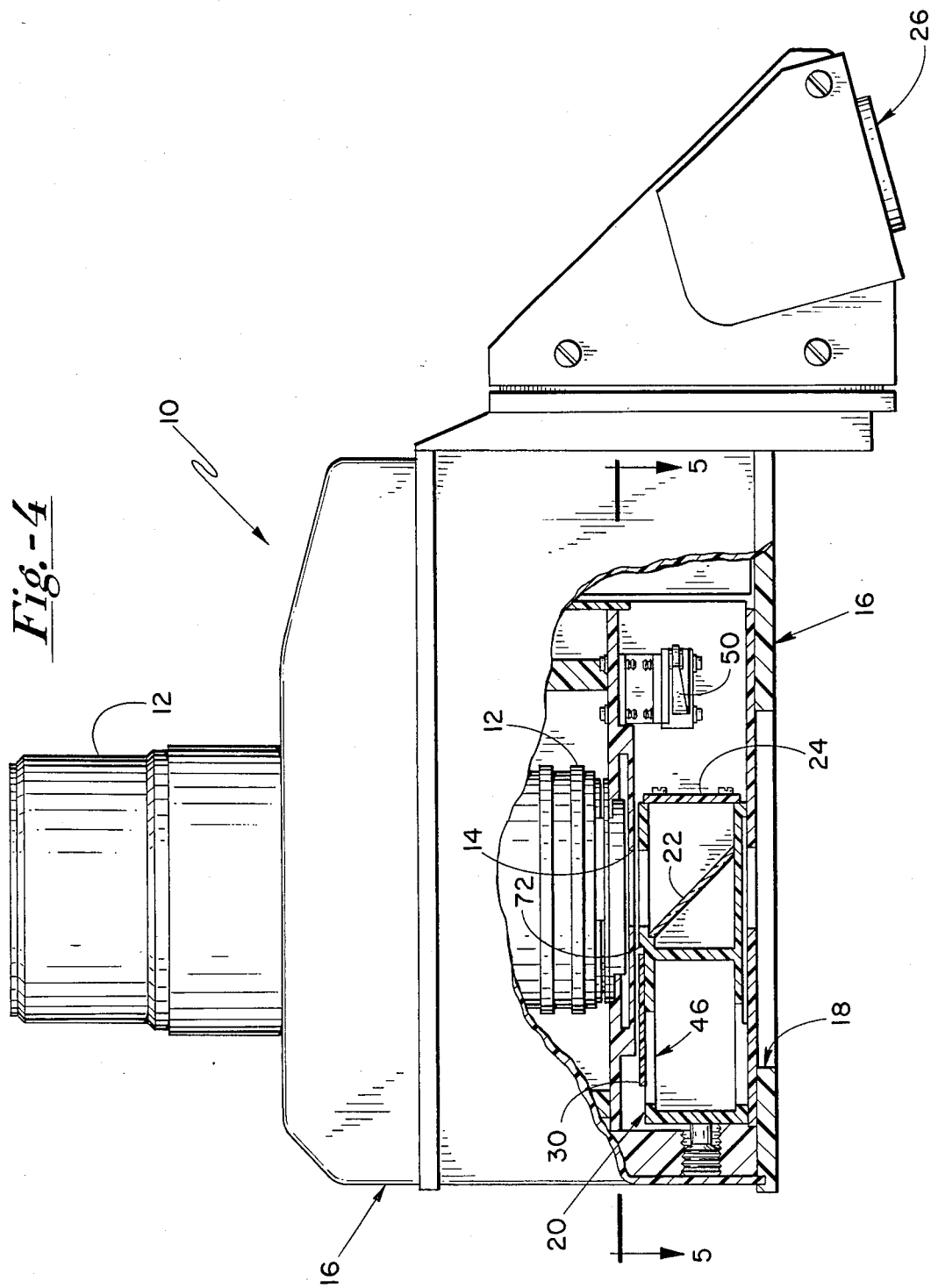
FIG. 4 is a side view of the camera of the invention with parts cut away to show the slide mechanism and mirror relative to the lens and film plane.
Figure 5:
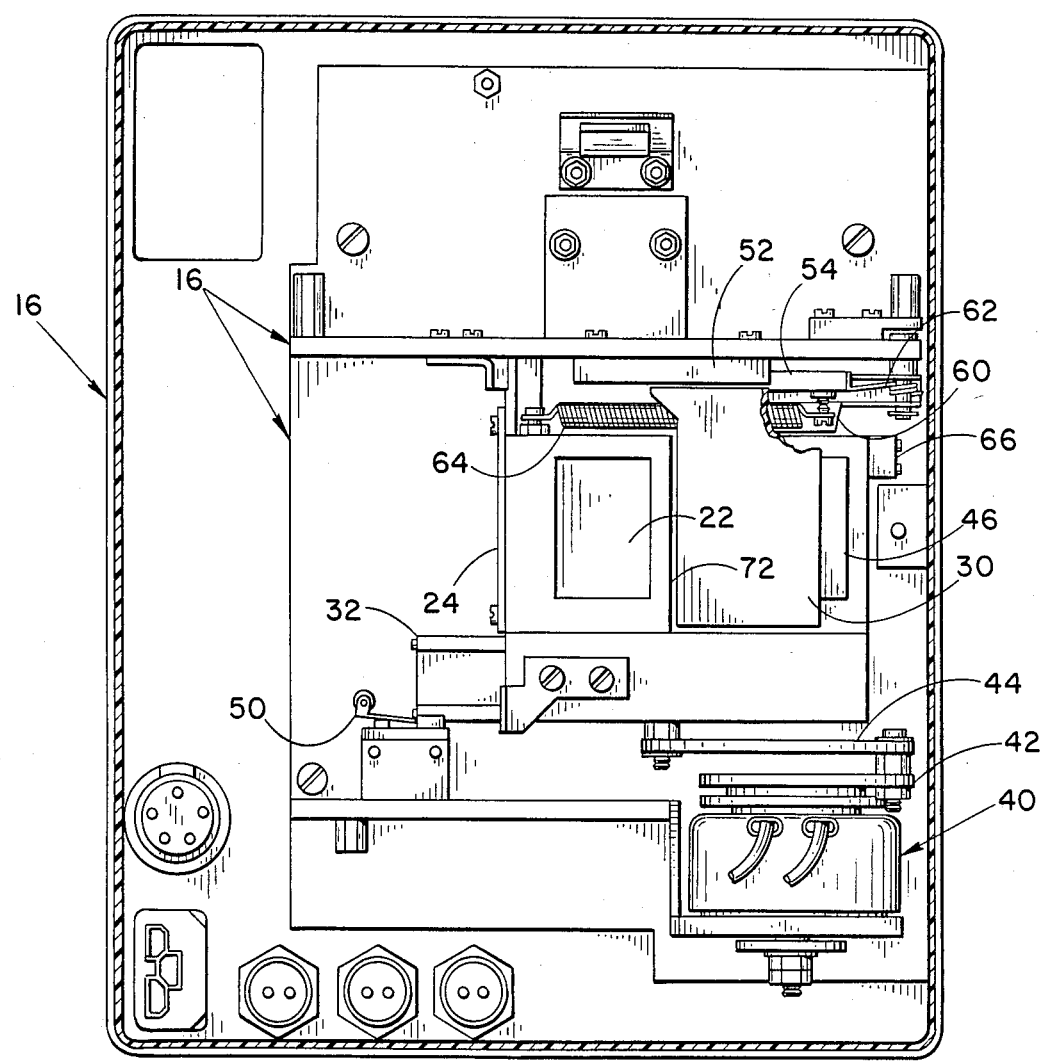
FIG. 5 is a top view of the camera of FIG. 4 taken across lines of 5—5 which eliminates the lens and lens housing.
Figure 6:
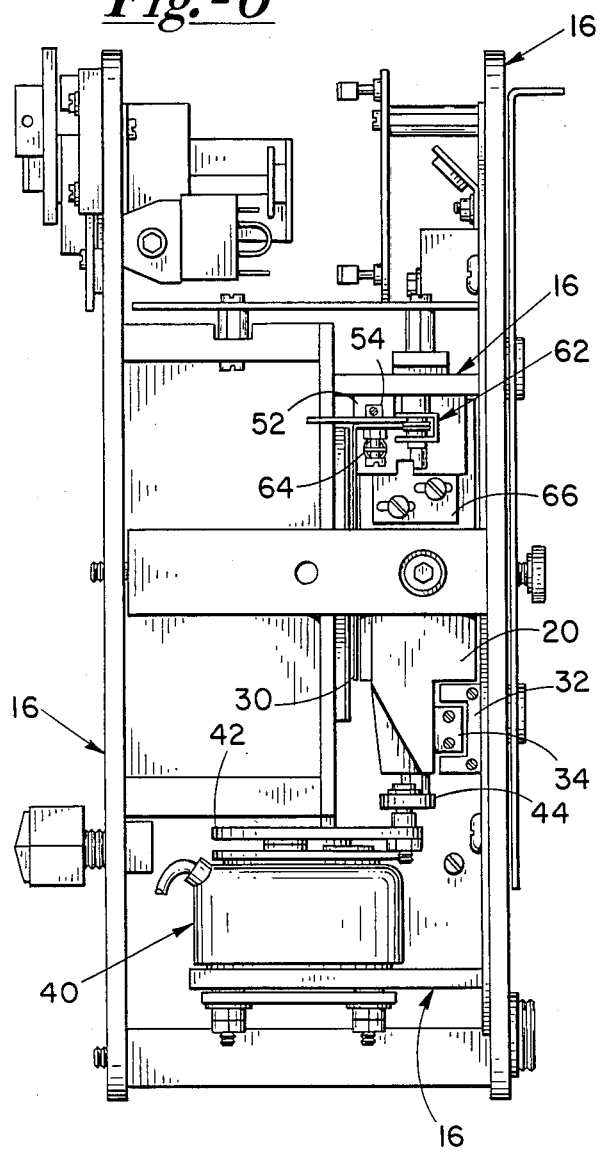
FIG. 6 is an end view of FIGS. 4 and 5 showing the relationship of the solenoid to the slide mechanism.
Figure 7:
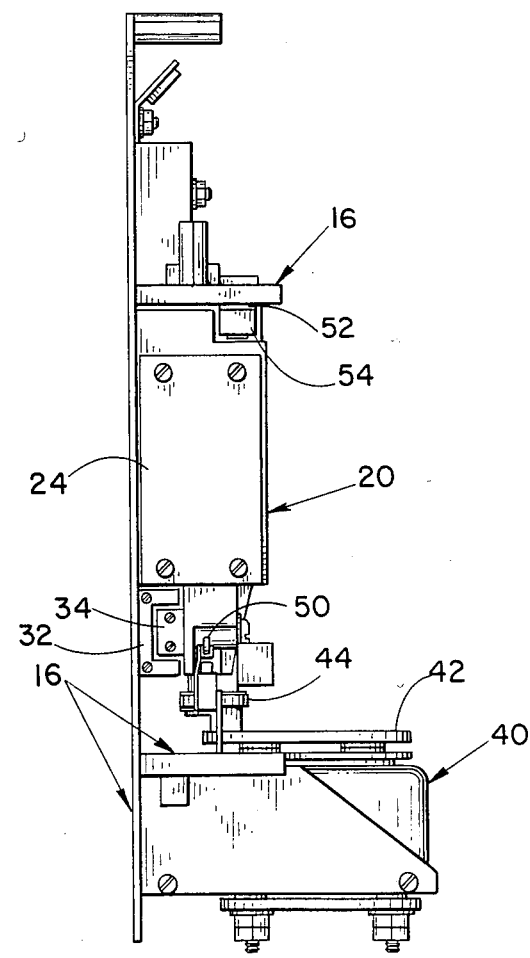
FIG. 7 is a view of the opposite end from the view of FIG. 6 with further parts cut away to show the relationship of the slide mechanism, viewing screen and solenoid.
Figure 8:
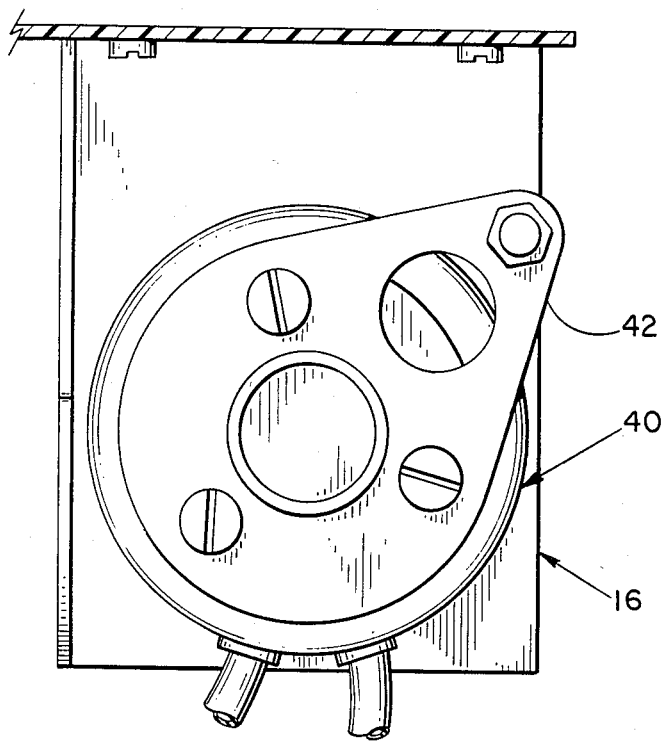
FIG. 8 is a side view of the rotary solenoid to the invention.
Figure 9:
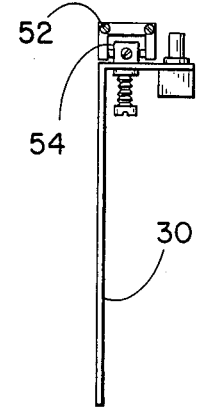
FIG. 9 is a side view of the shutter blade and slide of FIG. 5.

As shown in FIGS. 5 through 8, slide mechanism 20 is driven from a viewing position to a picture taking position by means of a rotary solenoid 40. Rotary motion of solenoid arms 42 is translated into lateral movement by linkage 44 which links the arm 42 to the slide mechanism 20. A suitable rotary solenoid is available from Ledex, Inc. of Vandalia, Ohio under its code 81840. The motor smoothly drives the slide mechanism to a picture taking position. The motor provides excellent control, with known speed, acceleration and timing. The positive driving of the slide mechanism to the picture taking position does not depend on heavy, (hopefully) matched springs which may change their characteristics with time. As best shown in FIG. 4 and 5 as the solenoid drives the slide mechanism 20 the shutter aperture 46 through the slide mechanism 20 becomes aligned with the aperture 14 of the housing 16. During its travel, the slide mechanism 20 reaches a microswitch 50 which is tripped by mechanism 20. Microswitch 50 is connected to a flash unit (not shown) which controls the exposure by adjusting light. The exposure is also controlled by lens of F stop setting. The camera itself has a single set speed since the rotary solenoid will always deliver the same, controlled shutter speed.

Figure 10:
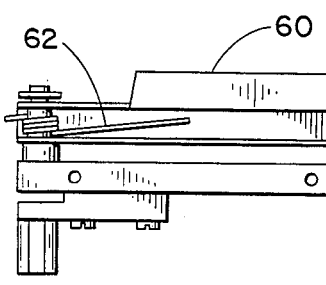
FIG. 10 is a top view of the shutter blade latch and shutter side of FIG. 5.
Figure 11:
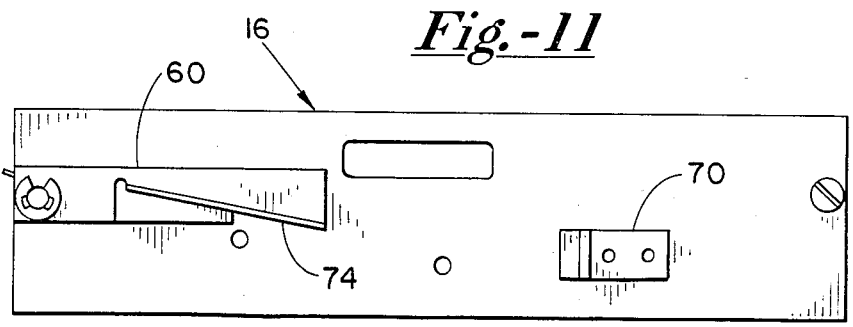
FIG. 11 is a side view of the shutter blade side latch and slide mechanism of FIG. 10.

In conjunction with the slide mechanism a masking plate 30 travels linearly in a direction parallel to the slide mechanism 20 travel. Masking plate 30 is slidably mounted to housing 16 by a second linear slide track 52 and mating portion 54. A latch 60 as shown in FIGS. 10 and 11 is normally pressed upwardly by the virtue of a torsion spring 62.

Masking plate 30 is attached to a spring 64 connected to slide mechanism 20 as shown in FIG. 5 such that the spring is pulled to an extended position when slide mechanism 20 is driven to a picture taking position by the rotary solenoid. A cam 66 on the slide mechanism 20 is positioned such that it engages latch 60 depressing same downwardly which releases the masking plate 30. The masking plate 30 is then pulled by spring 64 and closes shutter aperture 46. See FIGS. 1-3. As shows in FIGS. 10 and 11, masking plate 30 is pulled until it contacts stop 70.

As may be seen in FIGS. 1-4, the masking plate 30 is positioned slightly above the slide mechanism 20 and a lip 72 of the slide mechanism constructed to engage with the masking plate 30. As slide mechanism 20 is pulled by the solenoid 40 back to a viewing position, the lip 72 contacts the masking plate 30 and pushes it back to a latched position with latch 60.

In operation, when a photographer depresses a shutter button (not shown) the rotary solenoid 40 is energized and rotates causing arm 42 to drive slide mechanism 20 from the viewing position of FIG. 1 toward the picture taking position of FIG. 2. As slide mechanism 20 moves along its linear slide track 32, spring 64 is extended. Also, the cam 66 rides up the ramp 74 of latch 60 causing it to move down which releases the masking plate 30. Extended spring 64 rapidly pulls the masking plate 30 toward the shutter aperture closed position of FIG. 3. Before the masking plate covers the aperture, slide mechanism 20 trips microswitch 50 causing the flash to trip. Exposure is controlled by presetting the flash setting which regulates the lighting and also by presetting lens F stop setting which regulates the amount of light passing through the lens.

Before the slide mechanism reaches the end of its driven travel by solenoid 40, the masking plate completely covers the aperture. Thus, the exposure is completed while the slide mechanism is still being smoothly driven along its track. Camera movement and noise during exposure is thereby minimized. The coupling of the slide mechanism with the shutter (masking plate) eliminates the need for a separate shutter mechanism which reduces delay time from camera trip to exposure. This further reduces the possibility of blinks.

In considering this invention it must be remembered that the disclosure is illustrative only and that the scope of the invention is to be determined by appended claims.

What is claimed is:

1. In a photographic reflex camera having a housing, an objective lens, a viewfinder and a film plane within the housing disposed in an optical path through the lens, the improvement comprising:

(a) shutter means for driving a reflex mirror linearly to allow exposure of film to a light image from the lens and for closing the light path with a masking plate; and, (b) said shutter means including a slide mechanism carrying a reflex mirror, said slide mechanism being slidably mounted to said housing to allow lateral movement of said mirror into and out of said optical path, said shutter means including rotary solenoid means including a rotary solenoid and linkage means connecting said solenoid to said slide mechanism such that said slide mechanism may be smoothly driven into a picture taking position and for returning said slide mechanism to a viewfinding position, said shutter means further including masking plate means for sliding a masking plate between a latched position out of alignment with said optical path and an unlatched position masking the optical path through an aperture to stop the exposure, said masking plate means being in cooperating relationship with said slide mechanism such that return of said slide mechanism to a viewfinding position returns said masking plate to a latched position and said masking plate is unlatched by said slide mechanism as it is driven to a picture taking position.

2. The camera of claim 1 wherein said masking plate is unlatched by a cam on said slide mechanism, said cam being positioned such that said masking plate is released after the mirror is driven to a position clear of the aperture and prior to being driven to its full travel such that exposure is completed before said slide mechanism stops being driven.

3. The camera of claim 1 further including switch means for actuating external flash apparatus, said switch means including a member trippable by a portion off said slide mechanism as it is driven to a picture taking position.

4. The camera the claim 1 wherein said masking plate means includes a slide track to which said masking plate is slidably engaged, and said masking plate is pulled to a light masking position by a spring member.

5. The camera of claim 1 wherein said slide mechanism in its viewfinder position abuts against an adjustable member on said housing such that the extent of travel of the slide mechanism may be varied.

6. The camera of claim 1 wherein travel of said masking plate of said masking plate means is limited by a stop member on said housing.

* * * * *